United States Patent
Masuda et al.

(10) Patent No.: US 9,098,795 B2
(45) Date of Patent: Aug. 4, 2015

(54) IMAGE PROCESSING METHOD AND IMAGE PROCESSING APPARATUS

(71) Applicant: CANON KABUSHIKI KAISHA, Tokyo (JP)

(72) Inventors: Satoshi Masuda, Yokohama (JP); Yoshiyuki Honda, Kawasaki (JP); Nobuhiro Kitabatake, Tokyo (JP); Hitoshi Nishikori, Inagi (JP); Norihiro Kawatoko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/314,913

(22) Filed: Jun. 25, 2014

(65) Prior Publication Data
US 2015/0002909 A1    Jan. 1, 2015

(30) Foreign Application Priority Data
Jun. 28, 2013   (JP) .................. 2013-136153

(51) Int. Cl.
G06K 15/02   (2006.01)
G06K 15/10   (2006.01)

(52) U.S. Cl.
CPC .......... G06K 15/1872 (2013.01); G06K 15/102 (2013.01); G06K 2215/101 (2013.01)

(58) Field of Classification Search
None
See application file for complete search history.

(56) References Cited

U.S. PATENT DOCUMENTS

| 5,933,577 A * | 8/1999 | Naitoh et al. ............... 358/1.9 |
| 2005/0206981 A1* | 9/2005 | Hung ........................ 358/527 |
| 2006/0061830 A1* | 3/2006 | Sakakibara .................. 358/448 |

FOREIGN PATENT DOCUMENTS

| JP | 2002-326347 A | 11/2002 |
| JP | 2002326347 A | * 11/2002 |

* cited by examiner

*Primary Examiner* — Quang N Vo
(74) *Attorney, Agent, or Firm* — Canon USA Inc IP Division

(57) ABSTRACT

In image processing, for a pixel with a density level smaller than a predetermined threshold value, the density level is corrected based on a parameter representing a degree of condensation of ink in a nozzle. For pixel with a density level equal to or larger than the predetermined threshold value, the density level is not corrected. This makes it possible to suppress an unevenness in density caused by the condensation of ink while suppressing blur at a contour of a character or a thin line.

9 Claims, 16 Drawing Sheets

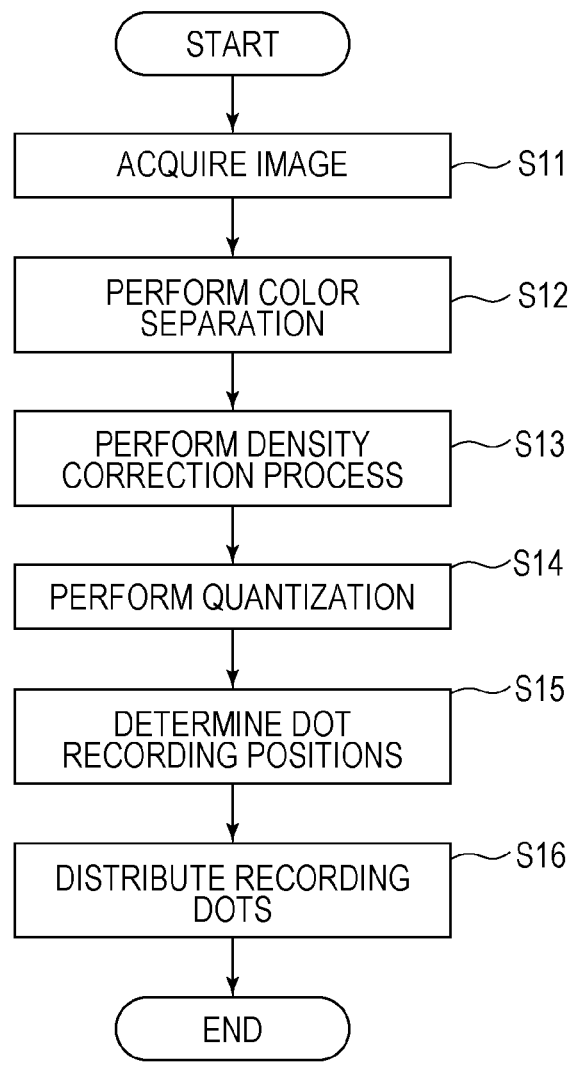

| THRESHOLD | OUT | EVALUATION |
|---|---|---|
| 255 | Level4 | 255 |
| 224 | Level3 | 192 |
| 160 | Level2 | 128 |
| 96 | Level1 | 64 |
| 32 | Level0 | 0 |
| 0 | | |

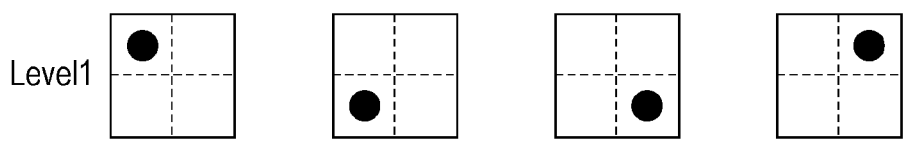
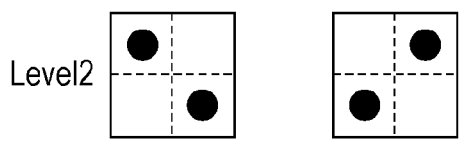
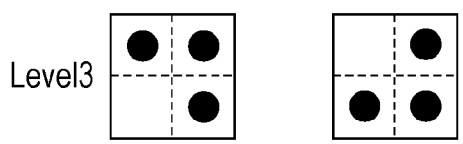
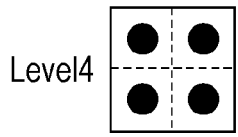

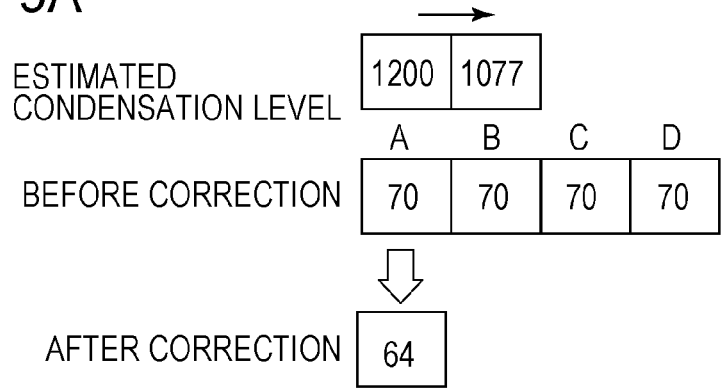

INK DATA

|  |  | 0 | ... | 64 |  |
|--|--|---|-----|----|--|
| ESTIMATED CONDENSATION LEVEL | 0 | 2 | ... | 0 |  |
|  | ⋮ | ⋮ |  | ⋮ |  |
|  | 1200 | 2 | ... | −123 |  |
|  |  | ⋮ |  | ⋮ |  |

600 dpi

| 64 | 64 | 64 | 64 |
|----|----|----|----|
| 64 | 64 | 64 | 64 |
| 64 | 64 | 64 | 64 |
| 64 | 64 | 64 | 64 |

600 dpi

FIG. 13A

| INK DATA | 70 | 70 | 70 | 70 | 70 |
|---|---|---|---|---|---|
| | A | B | C | D | E |
| CORRECTED INK DATA | 64 | 64 | 64 | 68 | 68 |
| ESTIMATED CONDENSATION LEVEL | 1200 | 1077 | 954 | | |

FIG. 13B

| ESTIMATED CONDENSATION LEVEL | INK DATA | |
|---|---|---|
| | ... | 70 | ... |
| ⋮ | | ⋮ | |
| 954 | ... | 64 | ... |
| ⋮ | | ⋮ | |
| 1200 | ... | 64 | ... |
| | | ⋮ | |

FIG. 14A
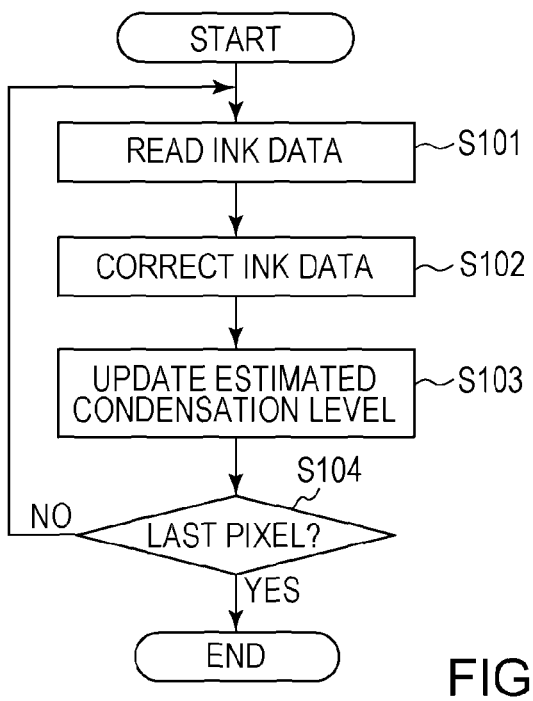
FIG. 14B
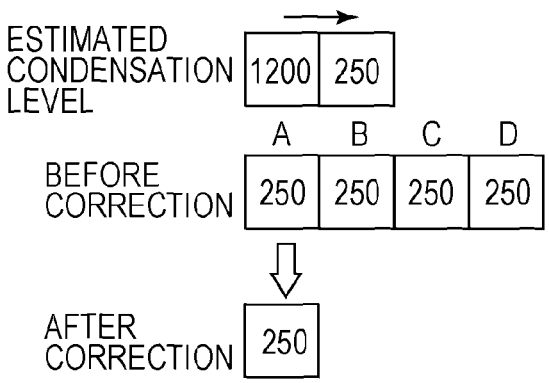
FIG. 14C
INK DATA
| | | ... | 70 | ... | 250 | ... | 255 |
|---|---|---|---|---|---|---|---|
| ESTIMATED CONDENSATION LEVEL | 0 | ... | 70 | ... | 250 | ... | 255 |
| | ⋮ | | ⋮ | | ⋮ | | ⋮ |
| | 600 | ... | 67 | ... | 250 | ... | 255 |
| | ⋮ | | ⋮ | | ⋮ | | ⋮ |
| | 954 | ... | 64 | ... | 250 | ... | 255 |
| | ⋮ | | ⋮ | | ⋮ | | ⋮ |
| | 1200 | ... | 64 | ... | 250 | ... | 255 |
| | ⋮ | | ⋮ | | ⋮ | | ⋮ |
FIG. 14D
INK DATA
| | | 0 | ... | 64 | ... | 250 | ... |
|---|---|---|---|---|---|---|---|
| ESTIMATED CONDENSATION LEVEL | 0 | 2 | ... | 0 | ... | 0 | ... |
| | ⋮ | ⋮ | | ⋮ | | ⋮ | |
| | 600 | 2 | ... | −60 | ... | −100 | ... |
| | ⋮ | ⋮ | | ⋮ | | ⋮ | |
| | 1200 | 2 | ... | −123 | ... | −950 | ... |
| | ⋮ | ⋮ | | ⋮ | | ⋮ | |

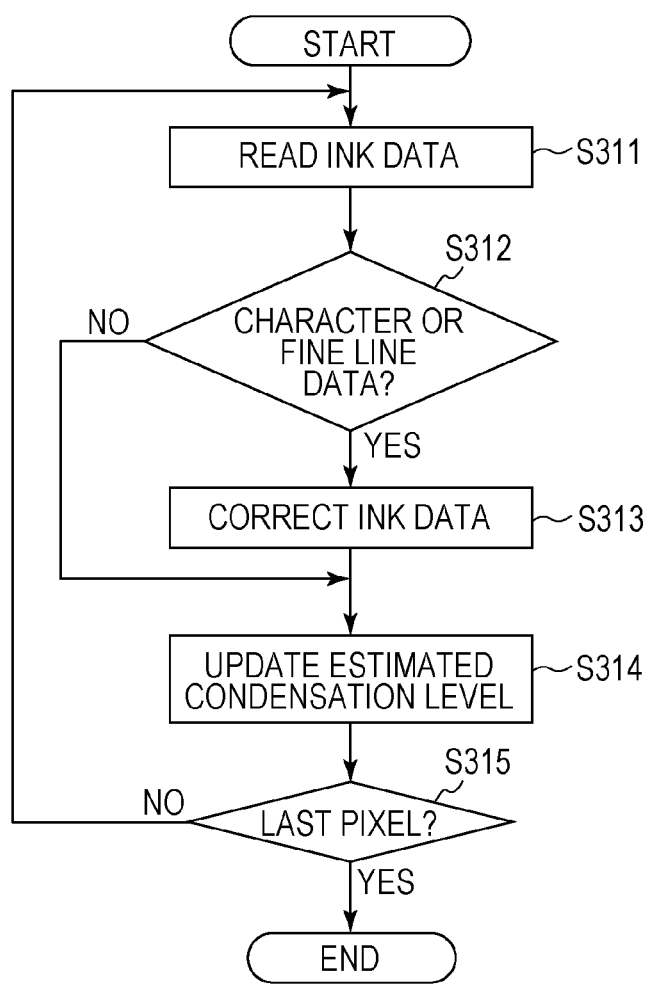

IMAGE PROCESSING METHOD AND IMAGE PROCESSING APPARATUS

BACKGROUND

1. Technical Field

The present disclosure relates to an image processing method and an image processing apparatus for forming an image on a recording medium by discharging an ink droplet.

2. Description of the Related Art

An ink-jet recording apparatus records an image on a recording medium by discharging ink droplets from nozzles disposed on a recording head. It is known that when the ink-jet recording apparatus has been in a long waiting time without recording an image on a recording medium, water in ink in a nozzle is evaporated, and as a result, the ink is condensed. In particular, evaporation of water in ink tends to easily occur close to a discharge orifice of a nozzle and thus density tends to become high close to the discharge orifice. If an ink droplet is discharged from a nozzle in a state in which the ink is condensed close to its discharge orifice, the discharged ink droplet has a higher density than usual. After the ink droplet is discharged, non-condensed ink is supplied from an ink tank, and thus condensation of ink in the nozzle disappears. Thus, after a nozzle has been in a standby state for a long time without being used in recording an image, if an image is recorded using this nozzle, the intensity becomes high at an edge of the image.

To suppress unevenness in density of an image caused by condensation of ink, Japanese Patent Laid-Open No. 2002-326347 discloses a technique of correcting the unevenness in density by reducing a density signal such that the amount of reduction increases with time period in which no ink is discharged.

However, in a case where the density signal is corrected using the technique disclosed in Japanese Patent Laid-Open No. 2002-326347, there is a possibility that degradation in image quality occurs, which makes it difficult to obtain a high-quality image depending on the type of the image. FIG. 1A illustrates an edge part of a character in a state before a correction is performed, and FIG. 1B illustrates the edge part of the character after the correction is performed. In the case where the correction process is performed on an image including a character using the technique disclosed in Japanese Patent Laid-Open No. 2002-326347, part of dots at an edge of the character are lost via the correction process, which causes unevenness to occur at the edge and thus the edge becomes blurred. This causes degradation in quality of characters in an image. The above situation occurs not only in an image including a character but may also occur in an image including a thin line or the like.

In view of the above, the present invention provides an image processing method capable of performing a correction process properly based on a degree of condensation of ink in a nozzle so as to suppress unevenness in density in an image while minimizing degradation in image quality of a character, a thin line, or the like.

SUMMARY

An embodiment of the invention provides an image processing method for recording an image on a recording medium by performing relative scanning between the recording medium and a recording head including a nozzle configured to discharge ink, including determining multilevel recording data such that when a multilevel data value corresponding to a first pixel on the recording medium is equal to or larger than a predetermined threshold value, the multilevel data value is employed as a value of the multilevel recording data, while when the multilevel data value is smaller than the predetermined threshold value, the multilevel data value is corrected based on a first parameter representing a degree of condensation of ink at a time when the first pixel is recorded by a nozzle assigned to record the first pixel, and the corrected multilevel data value is employed as the value of the multilevel recording data, and generating a second parameter based on the determined value of the multilevel recording data and the first parameter, the second parameter representing a degree of condensation of ink in the nozzle used in recording the first pixel at a time when a second pixel is recorded by the nozzle next after the first pixel.

The embodiment makes it possible to record a high-quality image including a character, a thin line, or the like while reducing unevenness in density caused by a condensation of ink in a nozzle.

Further features of the present invention will become apparent from the following description of exemplary embodiments with reference to the attached drawings.

BRIEF DESCRIPTION OF THE DRAWINGS

FIG. 3 is a flow chart illustrating image processing according to a first embodiment.

FIGS. 6A to 6I are diagrams illustrating locations of recording dots associated with quantized data.

FIGS. 9A to 9C are diagrams illustrating details of the density correction process according to the first embodiment.

FIGS. 13A and 13B are diagrams illustrating a method of generating a correction table.

FIGS. 14A to 14D are diagrams illustrating a density correction process according to a second embodiment.

FIG. 16 is a flow chart illustrating a density correction process according to a fourth embodiment.

DESCRIPTION OF THE EMBODIMENTS

Embodiments are described in detail below with reference to drawings.

First Embodiment

Figure 2A:
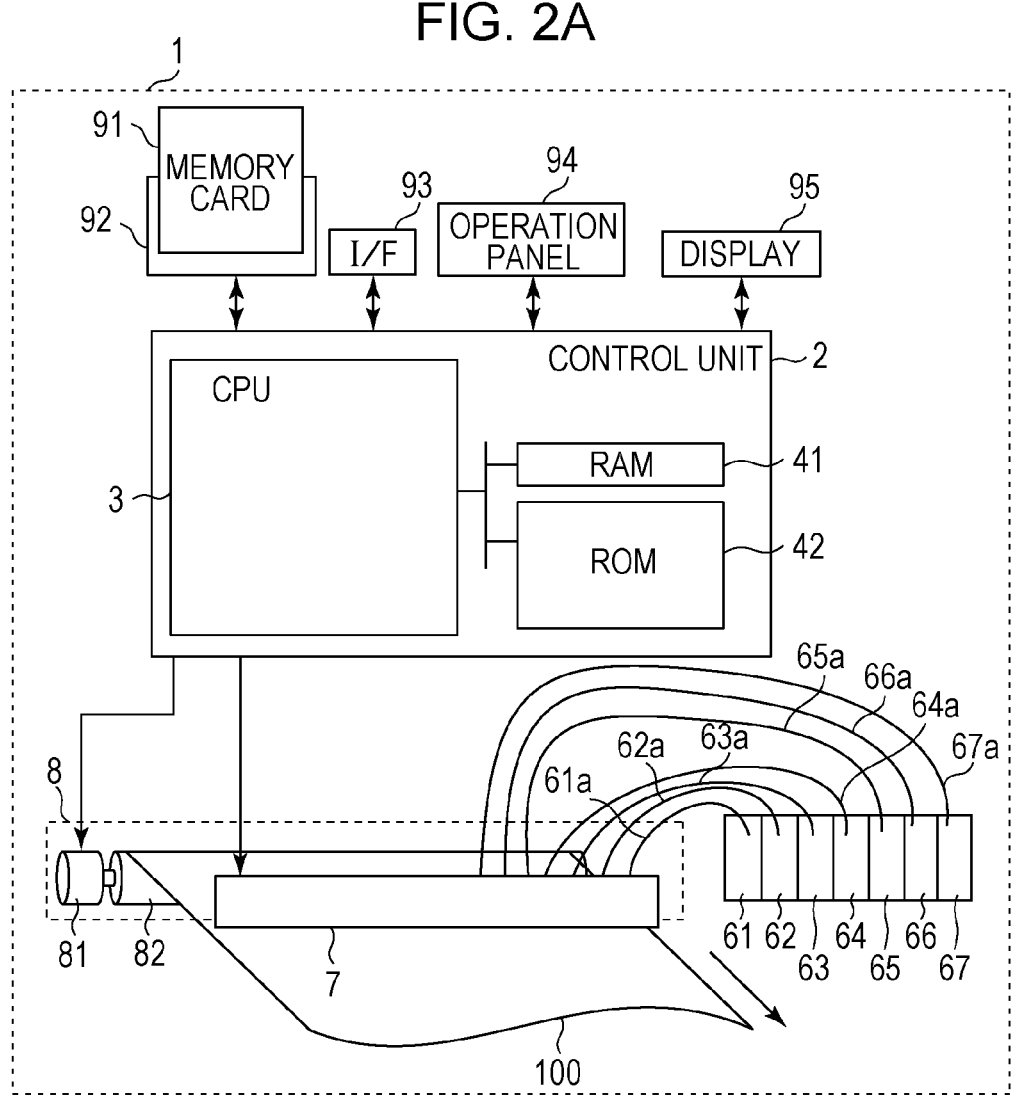
FIGS. 2A and 2B are schematic diagrams illustrating a recording apparatus according to an embodiment.
Figure 2B:
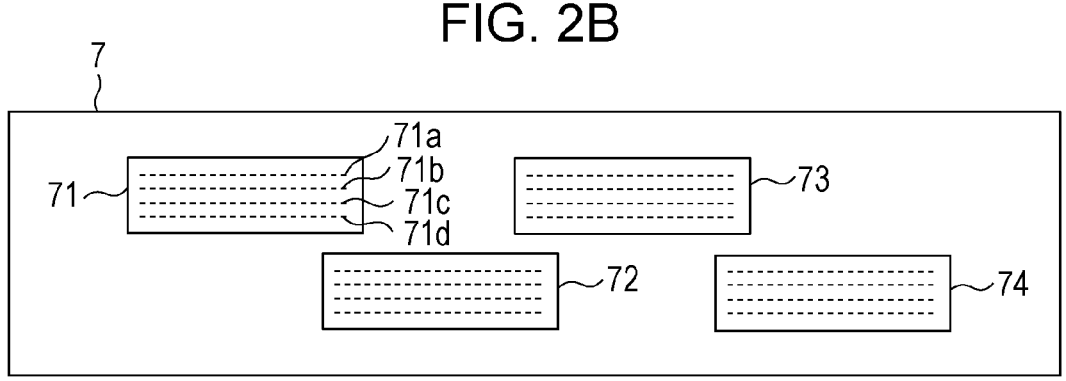

FIG. 2A is a schematic diagram illustrating an ink-jet recording apparatus according to a first embodiment, and FIG. 2B is a schematic diagram illustrating a recording head according to the present embodiment. The ink-jet recording apparatus 1 according to the present embodiment is a printer of a full line type, and includes a control unit 2, ink cartridges 61, 62, 63, 64, 65, 66, and 67, a recording head 7, and a recording medium conveying mechanism 8. In the ink cartridges 61 to 67, ink of cyan (C), magenta (M), yellow (Y), black (K), gray (Gy), light cyan (Lc), light magenta (Lm) are respectively disposed.

The recording head 7 is a recording head for use in the full line type printer, and includes a plurality of nozzles arranged in a direction crossing a conveying direction of a recording medium. The ink disposed in each of the ink cartridges 61 to 67 is supplied to nozzles of the recording head via corresponding one of ink supply pipes 61a, 62a, 63a, 64a, 65a, 66a, and 67a. It is possible to form an image on a recording medium 100 by discharging the ink from the nozzles.

The recording medium conveying mechanism 8 includes a paper feed motor 81 and a paper feed roller 82. The paper feed motor 81 drives the paper feed roller 82 to rotate thereby conveying the recording medium 100 to a position corresponding to the recording head 7.

The control unit 2 includes a CPU 3, a RAM 41, and a ROM 42, and controls the operation of the recording head 7 and the paper feed roller 81. The CPU 3 controls a process of generating image data according to which an image is recorded by the recording head 7, and the CPU 3 also controls the recording medium conveying mechanism by loading a control program stored in the ROM 42 into the RAM 41 and executing it.

FIG. 2B illustrates a structure associated with one of seven colors including cyan, magenta, yellow, black, gray, light cyan, and light magenta. In the ink-jet recording apparatus 1 according to the present embodiment, one recording head 7 is provided for each ink color. The recording head 7 includes discharge substrates 71, 72, 73, and 74 arranged in a staggered fashion. Each discharge substrate includes four nozzle arrays 71a, 71b, 71c, and 71d for discharging ink. Each nozzle array includes nozzles arranged in a direction crossing the conveying direction so as to provide a resolution of 1200 dpi. It is possible to record an image in a recording area by adjusting the timing of discharging ink droplets with the same color from the discharge substrates in synchronization with movement of the recording medium. Instead of arranging the discharge substrates in the staggered fashion as in the present example, the discharge substrates may be arranged in a single line.

In the present embodiment, it is assumed by way of example that a thermal ink-jet recording head is used in the recording apparatus, but the type of the recording head is not limited to this, and other types of recording heads may be used. For example, a piezoelectric ink-jet recording head may be used. There is no particular restriction on the type of the recording apparatus as long as it is capable of recording an image on a recording medium while relatively scanning the recording medium and the recording head. For example, the recording apparatus may be a full line printer in which a recording medium is conveyed with respect to a recording head, or may be a serial printer in which a recording head is scanned with respect to a recording medium. The colors of ink may include a color other than cyan, magenta, yellow, black, gray, light cyan, and light magenta. It may not be necessary to include all ink colors described above.

Next, image processing according to the present embodiment is described below.

Figure 4:
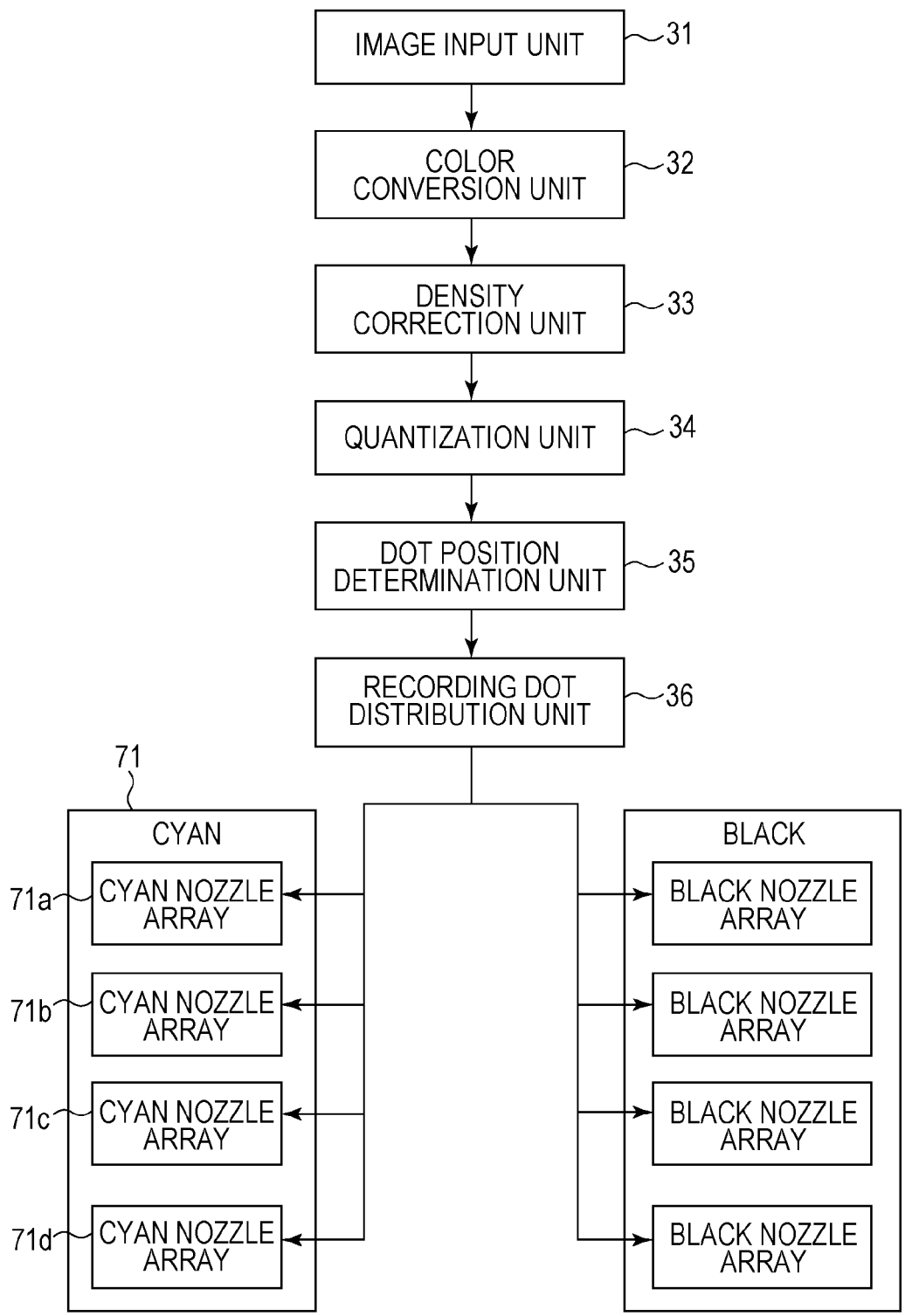
FIG. 4 is a diagram illustrating an outline of the image processing according to the first embodiment.

FIG. 3 is a flow chart illustrating a process of recording an image by performing image processing on image data stored in the memory card 91 of the recording apparatus 1 thereby converting multilevel image data into binary data (dot data) representing discharging/non-discharging of ink, and recording the image according to the binary data. FIG. 4 is a block diagram illustrating image processing according to the present embodiment.

First, after the start of the image processing, the control unit 2 acquires image data by reading it from the memory card 91 using the image input unit 31 (step S11). In the present embodiment, the acquired image data is color image data with a resolution of 600 dpi including R, G, and B components each having 256 intensity levels represented by 8 bits.

Next, a color conversion unit 32 performs a color conversion process (step S12). The color conversion process is a process of converting RGB color image data represented by a combination of intensity levels (density levels) of R (red), G (green), and B (blue) into ink color data corresponding to a plurality of ink colors used in recording an image. In the present embodiment, the recording apparatus 1 uses 7 colors of ink and thus, in the color conversion process, color image data having 256-level RGB components is converted into ink data with a resolution of 600 dpi having 8-bit 256-level CMYKGyLcLm color components.

Next, a density correction unit 33 performs a process of correcting a change in ink data density caused by condensation of ink (hereinafter, also referred to as a density correction process) for each color of the ink data thereby generating multilevel recording data (step S13). Details of the density correction process will be described later.

After the ink data density correction process, a quantization unit 34 performs a quantization process on the corrected multilevel recording data (step S14). This quantization process is a process of converting the multilevel recording data having 256 intensity levels into data having a less number of intensity levels thereby generating data with a number of intensity levels that can be dealt with by the recording apparatus 1 in recording an image. In the present embodiment, image data with 5 intensity levels (5 levels) from level-0 to level-4 is generated. In the quantization process, an error diffusion method or a dither method is generally used. In the present embodiment, the error diffusion method is used.

Figures 5A, 5B:
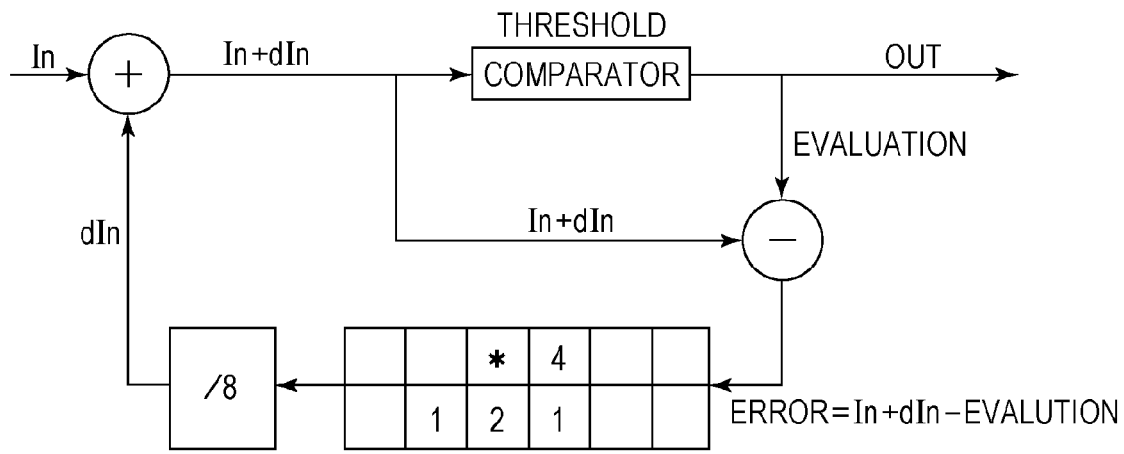
FIGS. 5A and 5B are diagrams illustrating an error diffusion process according to a related technique.

FIGS. 5A and 5B are diagrams illustrating an error diffusion process according to the present embodiment. FIG. 5A illustrating a flow of the error diffusion process, and FIG. 5B illustrates a table representing a relationship among a threshold value, an output level (Out), and an evaluation value (Evaluation).

First, an image density value (In) of a pixel of interest is added with a diffusion error value (dIn) which is given as a part of a multi-leveling error distributed to nearby pixels, thereby obtaining a corrected density value (In+dIn). A comparator compares the determined corrected density value (In+dIn) with threshold values and outputs an output level (Out) that is obtained by thresholding the corrected density value.

In the present embodiment, the output level is determined according to the table in FIG. 5B representing the relationship among the threshold value, the output level, and the evaluation value, as follows. When the corrected density value (In+dIn) is equal to or smaller than 32, level-0 is output as the output level (Out). When the corrected density value (In+dIn) is in a range greater than 32 and smaller than or equal to 96, level-1 is output as the output level (Out). When the corrected density value (In+dIn) is in a range greater than 96 and smaller than or equal to 160, level-2 is output as the output level (Out). When the corrected density value (In+dIn) is in a range greater than 160 and smaller than or equal to 224, level-3 is output as the output level (Out). When the corrected density value (In+dIn) is in a range greater than 224 and smaller than or equal to 255, level-4 is output as the output level (Out).

Next, a multi-leveling error (Error=In+dIn−Evaluation) is calculated by subtracting the evaluation value (Evaluation) from the corrected density value (In+dIn).

The relationship between the output level (Out) and the evaluation value (Evaluation) is obtained from the table, in FIG. 5B, representing the relationship between the output level and the evaluation value according to the present embodiment. In a case where the output level (Out) is level-0, 0 is output as the evaluation value (Evaluation). In a case where the output level (Out) is level-1, 64 is output as the evaluation value (Evaluation). In a case where the output level (Out) is level-2, 128 is output as the evaluation value (Evaluation). In a case where the output level (Out) is level-3, 192 is output as the evaluation value (Evaluation). In a case where the output level (Out) is level-4, 255 is output as the evaluation value (Evaluation).

Thereafter, an error value distributed to the location of the pixel of interest is read from an error buffer. The error value is normalized by the sum of weighting factors, and assigned as a diffusion error (dIn) to a next pixel. That is, in order to diffuse the calculated multi-leveling error to nearby pixels surrounding the pixel of interest, a weighted calculation is performed and a result is added to the error buffer. In the present embodiment, the error is diffused to nearby pixels at right, lower, lower right, and lower left sides of the pixel of interest. In the diffusing, weighting factors of 4/8, 2/8, 1/8, and 1/8 are assigned for the respective nearby pixels. Although in the present embodiment, the multi-leveling error is diffused to the pixels at the above-described locations with the above-described weighting factors, the pixel locations and the weighting factors are not limited to those described above. For example, the error may be diffused to two pixels at the right side of the pixel of interest or to two pixels at the lower side of the pixel of interest, and the weighting factors may be reduced with the distance from the pixel of interest.

The process described above is performed repeatedly until the process is completed for all pixels and thus 8-bit 256-level image data is quantized into 5-level image data recordable by the recording apparatus 1.

Referring again to FIG. 3, based on the image data quantized, in step S14, into recording pixel units with the less number of levels, a dot recording position determination unit 35 determines a dot recording position for each pixel on a recording medium (step S15).

FIG. 6 is a diagram schematically illustrating dot recording positions in pixels for respective levels. The image data quantized into recording pixels with a resolution of 600 dpi in five levels from level-0 to level-4 corresponds to bilevel dot data with a recording dot resolution of 1200 dpi, that is, dot data with a dot pattern of 2×2 pixels. For example, in a case where quantization results in level-1, one dot is recorded in a recording pixel with a resolution of 600 dpi. The one dot may be recorded at one of possible dot recording positions in four patterns, that is, in the upper left position (a), lower left position (b), lower right position (c), or upper right position (d). These positions are employed sequentially.

After the dot recording positions are determined, a nozzle array determination unit 36 distributes the dot data to the respective nozzle arrays (step S16).

Density Correction Process

Figure 1A:
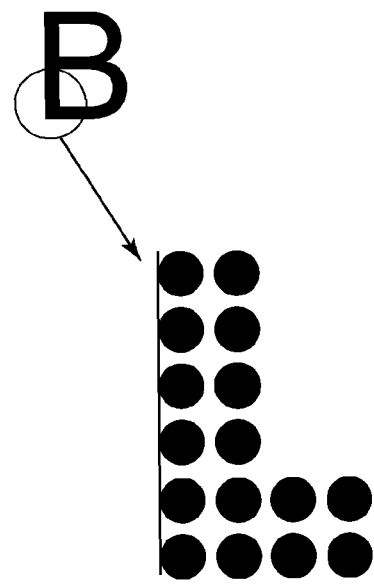
FIGS. 1A and 1B are diagrams illustrating a manner in which degradation in quality of a character or a thin line occurs.
Figure 1B:
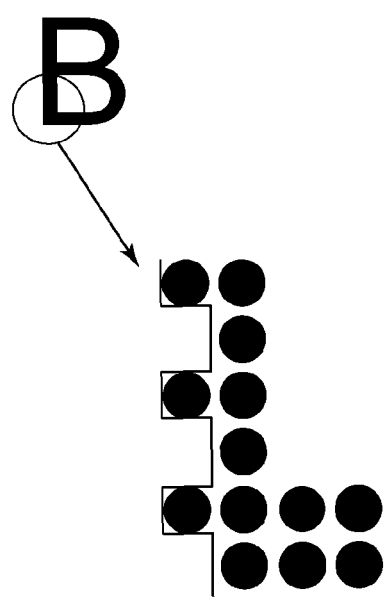

Next, the density correction process in step S13, which is one of features of the present embodiment, is described in further detail below. In the present embodiment, a process is performed on black ink data as described below. When no recording is performed over a particular period of time, ink in a nozzle may condense and thus an increase in density may occur at an edge of an image as described above. To handle the above situation, a density correction process is performed. On the other hand, the density correction process may cause unevenness to occur at an edge of a character or a thin line as illustrated in FIG. 1, which may cause the character or the thin line to be blurred and thus cause a reduction in image quality.

In the present embodiment, the above situation is handled as follows. Even in a case where there is a possibility that an increase in density may occur at an edge of an image, the correction process is not performed for pixels with intensity levels in a range in which unevenness in density is not easily perceived by human eyes, but the correction process is performed for pixels with intensity levels in a range in which unevenness in density is easily perceived. Details of the process will be described later.

Figure 7:
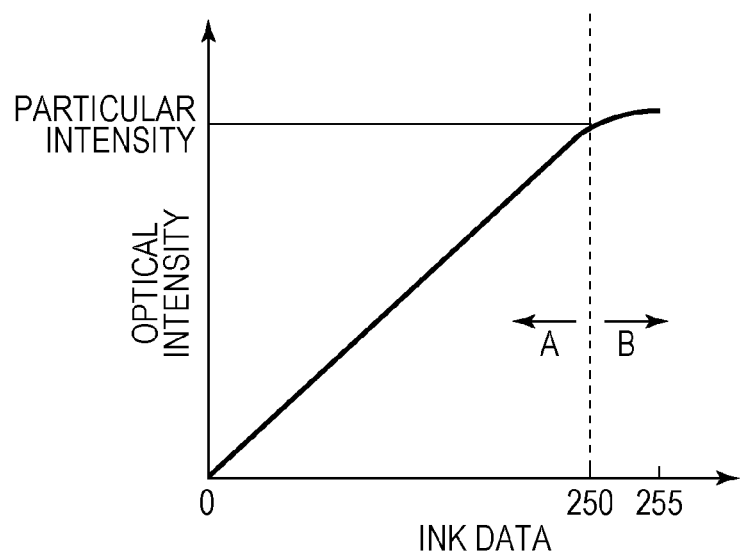
FIG. 7 is a diagram illustrates a relationship between an optical intensity and an intensity level of ink data.

FIG. 7 illustrates a curve representing an optical intensity as a function of ink data. In this figure, a range in which the intensity levels of ink data are smaller than the predetermined threshold value (250 in the present embodiment) is referred to as a range A, and a range in which the intensity levels are equal to or greater than the predetermined threshold value is referred to as a range B.

As the intensity level of ink data increases, the amount of ink applied to a unit area increases, and thus the number of ink droplets fired in the unit area increases. When discharging of ink droplets is performed a plurality of times, condensed ink in nozzles is replaced with non-condensed ink, and thus the degree of condensation of ink in nozzles is reduced. In this process, the higher the intensity level of the image, the more ink droplets with high density strike a small area on a recording medium. Therefore, the higher the intensity level of the image, the smaller the area formed by condensed ink droplets, and thus the less perceivable the unevenness in density of condensed ink is. In the present embodiment, intensity levels higher than the threshold value (in the range B) appear in a high-density image, in which the number of ink droplets fired per unit area is large. As may be seen from the density curve in FIG. 7, a change in optical density in this range B is small. Therefore, even when condensation occurs in ink droplets fired to an image with a high intensity level such as that in the range B, unevenness in density is not easily perceptible because the change in density of the image is small enough.

In the present embodiment, the density correction process is performed such that the intensity levels of pixels formed with condensed ink are corrected so as to suppress the unevenness in density of the recorded image. There is a possibility that the correction causes some ink droplets not to be shot, which otherwise would be shot. In particular, when the density correction causes the number of ink droplets to be reduced at an edge of a character or a thin line, unevenness is created along a contour as illustrated in FIG. 1. As a result, a blur may occur, which results in reduction in quality of a character or a thin line.

In the present embodiment, to handle the above situation, the density correction process is performed for pixels with intensity levels lower than the predetermined threshold value (in the range A) but the density correction process is not performed for pixels with intensity levels equal to or higher than the predetermined threshold value (in the range B). This makes it possible to suppress the unevenness in density caused by the condensation of ink in nozzles while minimizing the degradation in image quality of characters or thin lines.

In the present embodiment, 250 is used as the predetermined threshold value of the intensity level. However, the threshold value is not limited to this value. The threshold value may be set to a proper value depending on the number of condensed ink droplets discharged or depending on the dot recording positions of quantized ink data such that the threshold value defines an intensity level above which unevenness in density caused by the condensation of ink droplets is not easily perceived.

In the present embodiment, for ink data associated with black ink, the density correction process is performed or not performed depending on whether the intensity level of the pixel of interest is lower than the predetermined threshold value or the intensity level of the pixel of interest is equal to or higher than the predetermined threshold value. For any ink data other that black ink data, the density correction process is performed for all pixels regardless of their intensity levels. This is because it may be very desirable to suppress the degradation in the image quality of black characters or black thin lines, and because unevenness in density of condensed ink droplets is easily perceivable for tint color characters. However, depending on the degree to which unevenness in density is conspicuous, ink data associated with ink other than black ink may be treated such that the density correction process is not performed for pixels with intensity levels equal to or higher than a predetermined threshold value. Alternatively, the above-described method may be applied only to ink data of particular ink. For each ink, it may be allowed to change the threshold value by which to determine whether to perform the density correction process.

Density Correction Process

Referring to FIG. 8 and FIGS. 9A to 9C, the ink data density correction process in step S13 in FIG. 3 is described in further detail below. In the present embodiment, to handle the situation in which the degree of condensation of ink close to a discharge orifice in a nozzle changes frequently depending on whether an ink droplet is discharged or not discharged, the density correction process is performed such that the degree of condensation at the time of recording a pixel is predicted for each pixel, and the intensity level of each pixel is corrected. In the present embodiment, a parameter representing the degree of condensation of ink in a nozzle that is predicted to occur at the time when each pixel is recorded is referred to as an estimated condensation level. When the estimated condensation level is 0, this means that there is no condensation for ink in a nozzle. The estimated condensation level increases as the degree of condensation of ink in a nozzle increases, that is, as the density of ink increases.

Figure 8:
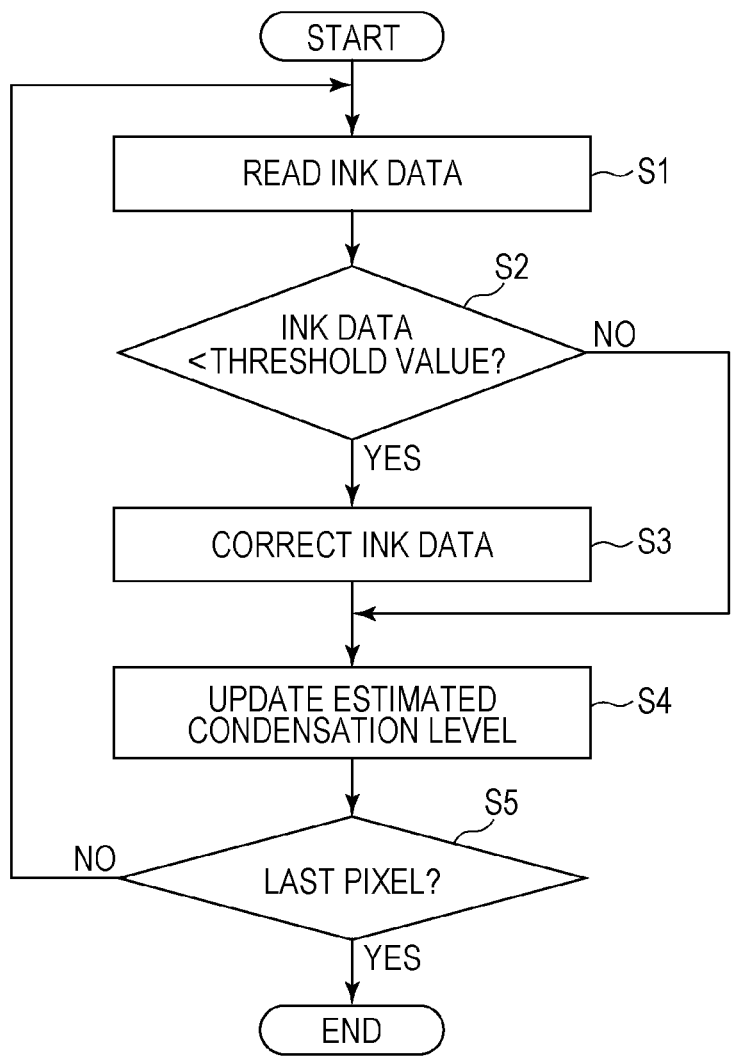
FIG. 8 is a flow chart illustrating a density correction process according to the first embodiment.

FIG. 8 is a flow chart illustrating the density correction process according to the present embodiment. FIGS. 9A to 9C are diagrams illustrating details of the density correction process. FIG. 9A is a diagram schematically illustrating a manner in which the density correction process is performed on an image with a uniform density including a plurality of pixels all having an ink data value of 70. A to D represent pixel locations on a recording medium. Ink is discharged from a certain nozzle sequentially onto a pixel A, a pixel B, a pixel C, and a pixel D thereby forming an image. In this example, it is assumed that the ink in the nozzle is already in a condensed state before the ink is discharged onto the pixel A, and the estimated condensation level (first parameter) is 1200 at a point of time when the pixel A is formed. FIG. 9B illustrates a correction table used in correcting ink data. FIG. 9C illustrates an estimated condensation level change table representing a change in estimated condensation level in a case where a pixel is formed according to corrected ink data.

Referring to the flow chart in FIG. 8, the flow of the process is described below. In step S1, ink data associated with a pixel of interest to be correct (first pixel) on a recording medium is read. Next, in step S2, a determination is performed as to whether the ink data of the pixel of interest is smaller than the predetermined threshold value. In a case where the ink data is smaller than the predetermined threshold value, the processing flow proceeds to step S3 in which the density correction process is performed on the ink data and multilevel recording data is generated. In a case where the ink data is equal to or larger than the predetermined threshold value, the density correction process in step S3 is not performed, but the ink data of the pixel of interest is converted into multilevel recording data and the process proceeds to step S4. In step S2 and step S3 described above, multilevel recording data is generated (first generation process), the quantization process described above is then performed based on the generated multilevel recording data and ink droplets are discharged onto the respective pixels. Then in step S4, an estimated condensation level at the time when a next pixel of interest will be recorded is generated based on the ink data (second generation step), and the content of the memory is updated. Next, in step S5, a determination is performed as to whether the pixel of interest is a last pixel. In a case where the pixel of interest subjected to step S1 to step S4 is not the last pixel, a pixel that is to be recorded with the same nozzle after the current pixel of interest is employed as a new pixel of interest, and the process is repeated from step S1 for the new pixel of interest. In a case where the current pixel of interest is the last pixel, the present process is ended.

Next, referring to FIGS. 9A to 9C, the process in step S2 to step S4 in FIG. 8 is described in further detail below. First, the pixel A is selected as the pixel of interest to be corrected. In step S2, the ink data of the pixel A is corrected using a correction table. FIG. 9B illustrates an example of a correction table that defines a correction amount by which to correct the ink data for various values of ink data of the pixel and for various estimated condensation levels at the time when pixel of interest is recorded. The estimated condensation level for the pixel A is 1200, and the ink data of the pixel A is 70, and thus 64 is obtained as the correction value 64 from the correction table. Thus, the ink data is corrected to 64.

Next, in step S3, the estimated condensation level is updated using the estimated condensation level change table. This process is performed to correct the estimated condensation level in response to the change in degree of condensation of the ink in the nozzle that occurs when the pixel A is recorded. That is, based on the ink data of the pixel A and the estimated condensation level (first parameter) predicted to occur when the pixel A is recorded, an estimated condensation level (second parameter) is acquired that is predicted to occur when the pixel B located next to the pixel A is recorded following the pixel A, and the value is updated. FIG. 9C illustrates an estimated condensation level change table used to acquire information on a change in estimated condensation level as a function of the ink data of the pixel of interest corrected in step S2 and the estimated condensation level of the pixel of interest. When an ink droplet is discharged for the pixel A, the discharging results in a reduction in the degree of condensation of the ink in the nozzle, and thus the estimated condensation level that is predicted to occur when the pixel B is recorded becomes smaller than the estimated condensation level predicted for the pixel A. The estimated condensation level for the pixel A is 1200 and the corrected ink data is 64, and thus −123 is obtained as the value of change in the estimated condensation level from the estimated condensation level change table. The value of −123 obtained as the change value is added to the estimated condensation level 1200 for the pixel A, which results in 1077. Thus, 1077 is obtained as the estimated condensation level predicted to occur when the pixel B, which is the next pixel of interest to be corrected and located next to the pixel A, is recorded. As in the case for the pixel A, a correction amount is determined from the ink data of the pixel B and the estimated condensation level, and the ink data is corrected, and then the estimated condensation level is updated by adding the change in condensation to the estimated condensation level. Following the pixel B, the process is performed similarly on the pixel C, the pixel D and so on until the density correction process is completed for all pixels.

In the present embodiment, based on the corrected ink data of the pixel A and the estimated condensation level at the time when the pixel A is recorded, the estimated condensation level is determined at the time when the pixel B is recorded following the pixel A, and the estimated condensation level is updated. However, the present embodiment is not limited to this. For example, estimated condensation levels for all pixels may be determined based on ink data of all pixels and the determined values may be stored.

Method of Generating Estimated Condensation Level Change Table

Next, a method of generating the estimated condensation level change table is described below with reference to FIGS. 10A and 10B, FIGS. 11A and 11B, and FIGS. 12A, 12B, and 12C. In the present embodiment, ink data of each color with a resolution of 600 dpi is quantized into bilevel dot data with a resolution of 1200 dpi. That is, ink data of one pixel in 600 dpi corresponds to dot data of 2×2=4 pixels in 1200 dpi. The dot data associated with these 4 pixels is recorded using 4 nozzles arrays. Therefore, to record original ink data of one pixel, 2 nozzles in each nozzle array and thus a total of 8 nozzles are used. Therefore, when the estimated condensation level for one pixel of ink data is determined, it is necessary to take into account the degree of condensation for all 8 nozzles. In the present embodiment, the estimated condensation level is given by a mean value of values representing degrees of condensation (hereinafter referred to as a cumulative value) of respective nozzles in a nozzle group including at least one nozzle (8 nozzles in the present embodiment).

Figure 10A:
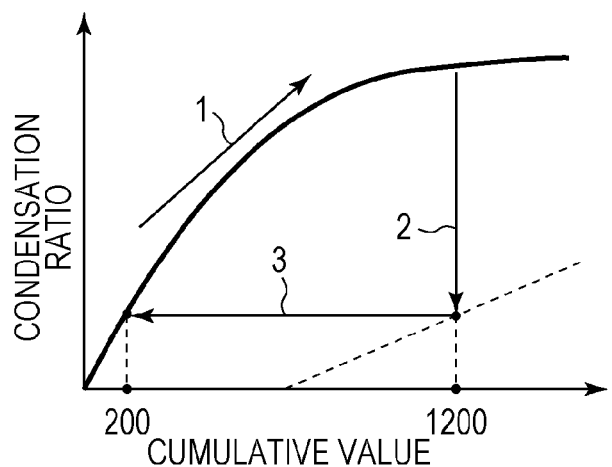
FIGS. 10A and 10B are diagrams illustrating a concept of a cumulative value of each nozzle.
Figure 10B:
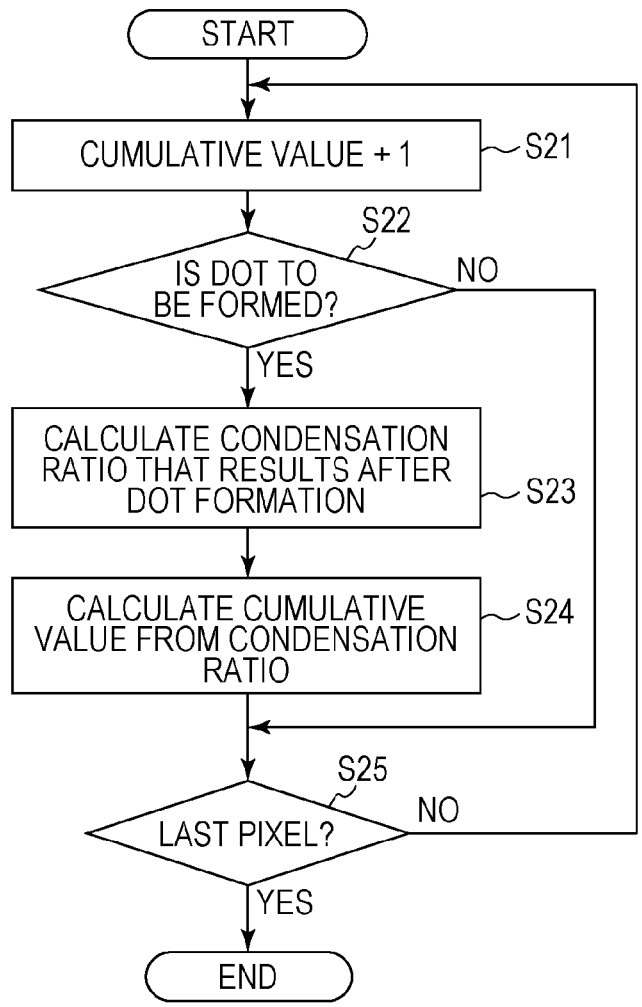

Referring to FIGS. 10A and 10B, the cumulative value of each nozzle is described below. FIG. 10A illustrates a relationship between the cumulative value and the ink condensation ratio for certain ink. The ink condensation ratio is the ratio of the optical intensity of a dot formed by discharging a condensed ink to the optical intensity of a dot formed by discharging a non-condensed ink. In FIG. 10A, at an origin, condensation ratio (represented along a vertical axis) is 1, which is a condensation ratio for non-condensed ink. A solid line represents an ink condensation ratio as a function of a cumulative value, which indicates that the density increases with the condensation ratio. A broken line represents a condensation ratio of ink in a nozzle in a state immediately after one dot of ink droplet is discharged from the nozzle with a condensation ratio corresponding to a cumulative value. In a range in which the cumulative value is small, that is, when the condensation of ink is not great and thus the density of the ink is not high, the condensation of ink in a nozzle is released when one droplet is discharged, and the condensation ratio returns to 1. However, when the condensation of the ink becomes higher than a certain level, discharging of one droplet does not release the condensation of ink in the nozzle, and the condensation ratio remains higher than 1. As the cumulative value increases, the degree of condensation increases and it becomes more difficult to release the condensation by discharging one droplet.

FIG. 10B is a flow chart of a process of calculating the cumulative value for a nozzle which varies when the nozzle is used to record a pixel. The cumulative value is calculated using the graph illustrated in FIG. 10A. The solid line and the broken line in FIG. 10A may be approximated by a mathematical function that allows it to determine the condensation ratio and the cumulative value by calculation. First, in step S21, a value is read to acquire a cumulative value at the time when a pixel of interest on a recording medium is recorded by a nozzle, and 1 is added to the cumulative value (as illustrated by an arrow 1). This means that as the pixel subjected to processing is changed, the degree of condensation of the ink in the nozzle increases. In step S22, a determination is performed as to whether to discharge an ink droplet onto a pixel of interest. In a case where it is determined that no ink droplet is to be discharged, the processing flow proceeds to step S25. In a case where it is determined that an ink droplet is to be discharged, the processing flow proceeds to step S23, in which a calculation is performed using the graph illustrated in FIG. 10A to determine the cumulative value of ink in the nozzle in a state after the ink droplet is discharged. For example, in a case where the cumulative value in step S22 is 1200, a value on the broken line is read to determine a condensation ratio which results from a change caused by discharging of the ink droplet from the nozzle having the cumulative value of 1200 (as illustrated by an arrow 2). Next, in step S24, a value on the solid line corresponding to the determined condensation ratio is read (as illustrated by an arrow 3). Thus 200 is obtained as the cumulative value in the state after the ink droplet is discharged. This cumulative value is to be used when a pixel next to the current pixel of interest is recorded. Next, in step S25, it is determined whether the current pixel is a last pixel. In a case where the pixel is not the last one, a next pixel to be processed is selected and the process described above is repeated to calculate the cumulative value.

Figure 11A:
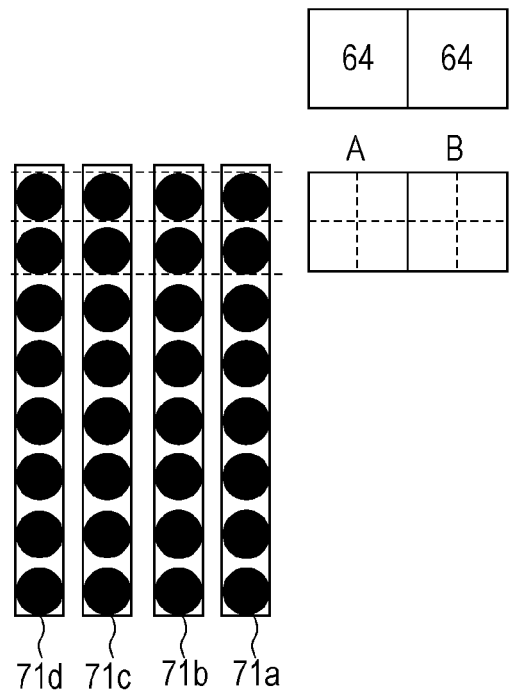
FIGS. 11A and 11B are diagrams illustrating a method of generating an estimated condensation level change table.
Figure 11B:
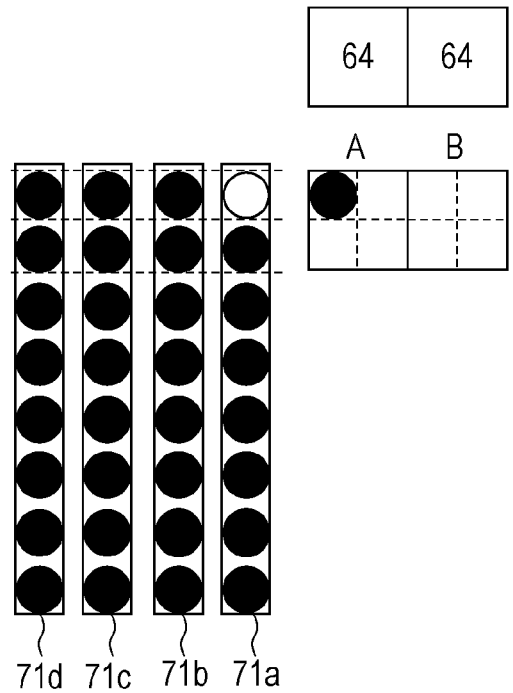

Next, a method of calculating the estimated condensation level is described below referring to FIGS. 11A and 11B. In this example, it is assumed that ink data of each pixel has a value of 64, and dots are formed using the dot pattern of level-1 (one dot per pixel) illustrated in FIGS. 6A to 6D. Ink data of one pixel has a resolution of 600 dpi×600 dpi, and dots of one raster are formed using 2 nozzles×4 nozzle arrays (71a to 71d)=8 nozzles in total. In a case where one pixel of ink data is recorded using a plurality of nozzles as in the present embodiment, it is not possible to identify which nozzle is used to discharge ink, and thus it is difficult to predict the degree of condensation on a nozzle-by-nozzle basis. Therefore, it is assumed that nozzles are used with equal probability in forming dots of one pixel of ink data, and the mean value of cumulative values for all nozzles is determined probabilistically, and the determined mean value is used as the estimated condensation level. FIG. 11A illustrates a state before the pixel A is recorded. In this state, 8 nozzles are all in the same condensation state (as represented by solid circles in FIG. 11A). If it is assumed that the cumulative value is 1200 equally for all 8 nozzles, the estimated condensation level at the time when the pixel A is recorded is given by 1200×8/8=1200. FIG. 11B illustrate a state in which one dot has been formed using one of nozzles after the state illustrated in FIG. 11A. In the nozzle used to form the dot, a droplet of condensed ink is discharged and thus the degree of condensation of ink in the nozzle decreases (as illustrated by an open circle in FIG. 11B). The cumulative value in this state is calculated using the method described above with reference to FIGS. 10A and 10B. When the cumulative value is 200 for the nozzle that has discharged the ink droplet, the mean cumulative value immediately before a dot is formed for the pixel B is calculated such that +2 is added to the cumulative value to reflect a change that occurs during movement of one pixel in 600 dpi from the pixel A to the pixel B, and thus the mean cumulative value is given by 1202×7/8+202×1/8=1077.

Figures 12A, 12B, 12C:
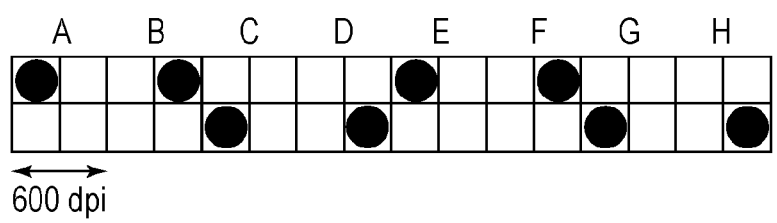
FIGS. 12A to 12C are diagrams illustrating a method of generating an estimated condensation level change table.

FIG. 12A illustrates an estimated condensation level change table representing a change in estimated condensation level on a pixel-by-pixel basis with 600 dpi. More specifically, the estimated condensation level change table in FIG. 12A represents the value of change by which to calculate an estimated condensation level for a next pixel of interest to be subjected to the density correction process, from ink data and an estimated condensation level of a current pixel of interest. In a case where ink data has a value of 0, no dot is formed, and thus the estimated condensation level is increased by an amount corresponding to 2 pixels (+2) that occurs in a period in which no ink droplet is discharged until a next pixel. Not only in the case where the ink data has a value of 0, but also in a case where the value becomes 0 after the quantization into 5 levels is performed, and thus even one dot is not formed, +2 is set in the estimated condensation level change table. On the other hand, in a case where the value after the quantization into 5 levels is equal to or greater than 1, that is, in a case where one or more dots are formed, the amount of change is given by the sum of a reduction in ink condensation resulting from the forming of dots and an increase (+2) in condensation that occurs during a period in which no ink droplet is discharged until a next pixel.

FIG. 12B and FIG. 12C illustrates a method of calculating a change in estimated condensation level. First, an image with uniform ink data values is prepared for each ink data. In the example illustrated in FIG. 12B, it is assumed that the ink data has a value of 64 over the entire image. The value of 64 of ink data corresponds to a state in which one dot is formed for one pixel of ink data with 600 dpi. The quantization process is performed on this uniform image thereby acquiring dot data defining locations where dots are to be formed. FIG. 12C illustrates one raster of the ink data extracted from the ink data illustrated in FIG. 12B. In FIG. 12C, locations of respective pixels are denoted by A to H. Nozzles for use in forming dots in 1200 dpi in an upper half of one pixel in resolution of 600 dpi are referred to as even nozzle, and nozzles for use in forming dots in a lower half are referred to as odd nozzles. In FIG. 12C, a dot is formed in the pixel A using an even nozzle in a nozzle array 71a, a dot is formed in the pixel B using an even nozzle in a nozzle array 71b, a dot is formed in the pixel C using an odd nozzle in the nozzle array 71a, and a dot is formed in the pixel D using an odd nozzle in the nozzle array 71b. Similarly, a dot is formed in the pixel E using an even nozzle in a nozzle array 71c, a dot is formed in the pixel F using an even nozzle in a nozzle array 71d, a dot is formed in the pixel G using an odd nozzle in the nozzle array 71c, and a dot is formed in the pixel H using an odd nozzle in the nozzle array 71d. For each pixel, a calculation is performed to determine estimated condensation levels indicating the degrees of condensation of ink in nozzles immediately before dots are formed. The calculation of the estimated condensation levels may be performed using the method described above with reference to FIGS. 10A and 10B and FIGS. 11A and 11B. In the pixel A, if it is assumed that the cumulative value is 1200 equally for all nozzles, then the mean value of cumulative values in the pixel A is 1200, and then the mean value of cumulative values in the pixel B is 1077. The difference in the mean value between a next pixel and a current pixel is calculated for each pixel thereby determining a change in the mean value of cumulative values corresponding to an estimated condensation level and an ink data value. For example, in a case where the mean cumulative value is 1200 and the ink data has a value of 64, the change in the mean value of cumulative values is given by 1077−1200=(−123). By performing the above-described calculation repeatedly until the condensation of ink is released. Thus, for the ink data with the value of 64, it is possible to set the amount of change in the above-described manner for each of various estimated condensation levels. Similarly, by setting changes in estimated condensation levels for each ink data value, it is possible to generate an estimated condensation level change table.

Method of Generating Correction Table

Referring to FIGS. 13A and 13B, a method of generating a correction table is described below. FIG. 13A illustrates a sample of a correction image used as a reference in generating the correction table. FIG. 13B illustrates a generated correction table. The correction sample is generated by performing a correction on the uniform image of ink data with a value of 70 such that the ink data values of respective pixels are adjusted in units of 600 dpi so as to obtain a uniform density. In FIG. 13A, A to E denote pixels, in which numerals in respective boxes represent ink data values corrected so as to obtain uniform density. The estimated condensation level of each pixel illustrated in FIG. 13A is a value calculated using an estimated condensation level change table (not illustrated) generated in the above-described manner.

In FIG. 13A, the density becomes equal among the pixels A to C when the ink data value is set to 64, and the estimated condensation level for the pixel C is 954. When the estimated condensation level is in a range from 954 to 1200, the density is adjusted by correcting the ink data value 70 from to 64, and thus parameters in the correction table are set as illustrated in FIG. 13B. Subsequently, further parameter values in the correction table are determined by performing the calculation depending on the estimated condensation level until no more correction is necessary in the correction image sample in FIG. 13A. It is possible to obtain a complete correction table by performing the above-described process for each ink data value.

In the present embodiment, as described above, when the ink data value is equal to or larger than the predetermined threshold value, the density correction process is not performed, but the density correction process is performed when the ink data value is smaller than the predetermined threshold value. That is, the correction process is not performed for an image with a high density, and thus it becomes possible to suppress occurrence of unevenness at an edge of an object caused by the correction, in particular of an object for which a sharp edge may be desirable such as with a black character.

Second Embodiment

In a second embodiment described below, the density correction process is performed in a different manner from that according to the first embodiment described above. FIGS. 14A to 14D illustrates a specific example of the density correction process according to the second embodiment.

In the first embodiment described above, the determination is performed as to whether the ink data value for each pixel is equal to or greater than the predetermined threshold value or smaller than the predetermined threshold value, and the density correction process is not performed for pixels with ink data values equal to or greater than the predetermined threshold value. In contrast, in the present embodiment, the determination is not performed as to whether ink data values are equal to or larger than the threshold value, but, for any pixel, the processing flow proceeds to the step of the density correction process. In the correction table, the correction amount is set to 0 for ink data values equal to or greater than the predetermined threshold value regardless of the degree of condensation of ink in nozzles, and thus no correction is performed when the ink data value is equal to or greater than the predetermined threshold value and the value is maintained. On the other hand, the correction table is set such that for ink data with a value smaller than the predetermined threshold value, the ink data value is reduced depending on the estimated condensation level of ink.

FIG. 14A is a flow chart of the density correction process according to the present embodiment. FIG. 14B is a diagram illustrating a manner in which the density correction process is performed for a uniform image whose ink data values are all equal to 250. FIG. 14C illustrates a correction table, and FIG. 14D illustrates an estimated condensation level change table. Herein it is assumed by way of example that when the present image starts to be recorded, condensation of ink in nozzles has already occurred, and the estimated condensation level is 1200 when the pixel A in FIG. 14B is recorded.

First, the pixel A is selected as a pixel of interest. In step S101, ink data 250 is read. In step S102, the ink data is corrected using the correction table illustrated in FIG. 14C. In this specific example, the estimated condensation level is 1200, and the ink data has a value of 250, and thus 250 is obtained as a correction value from the correction table. That is, in this case, the ink data is remained at 250 without being changed. Next, in step S103, the estimated condensation level at the time when the pixel B is recorded is calculated using the estimated condensation level change table illustrated in FIG. 14D. In this specific example, the estimated condensation level at the time when the pixel A is recorded is 1200, and the corrected ink data value is 250, and thus −950 is obtained as the amount of change from the estimated condensation level change table. The change value of −950 is added to the estimated condensation level of 1200 for the pixel A, and thus 250 is obtained as the estimated condensation level at the time when the pixel B, which is a next pixel of interest, is recorded, and the estimated condensation level is updated to the obtained value. In step S104, it is determined whether the current pixel is the last one. In a case where the pixel is not the last one, the process is performed similarly on pixels following the pixel B until the density correction process is completed for all pixels.

As described above, by using the correction table set such that no correction is performed for pixels with an intensity level equal to or larger than the threshold value, it becomes possible to reduce the processing load compared with the first embodiment described above.

Third Embodiment

In the first and second embodiments described above, the density correction process is not performed when the intensity level of ink data is equal to or larger than the predetermined threshold value. In contrast, in a third embodiment described below, the determination as to whether to correct the density of ink data is performed based on attribute information indicating whether each pixel is an element of a character or a thin line.

Figure 15:
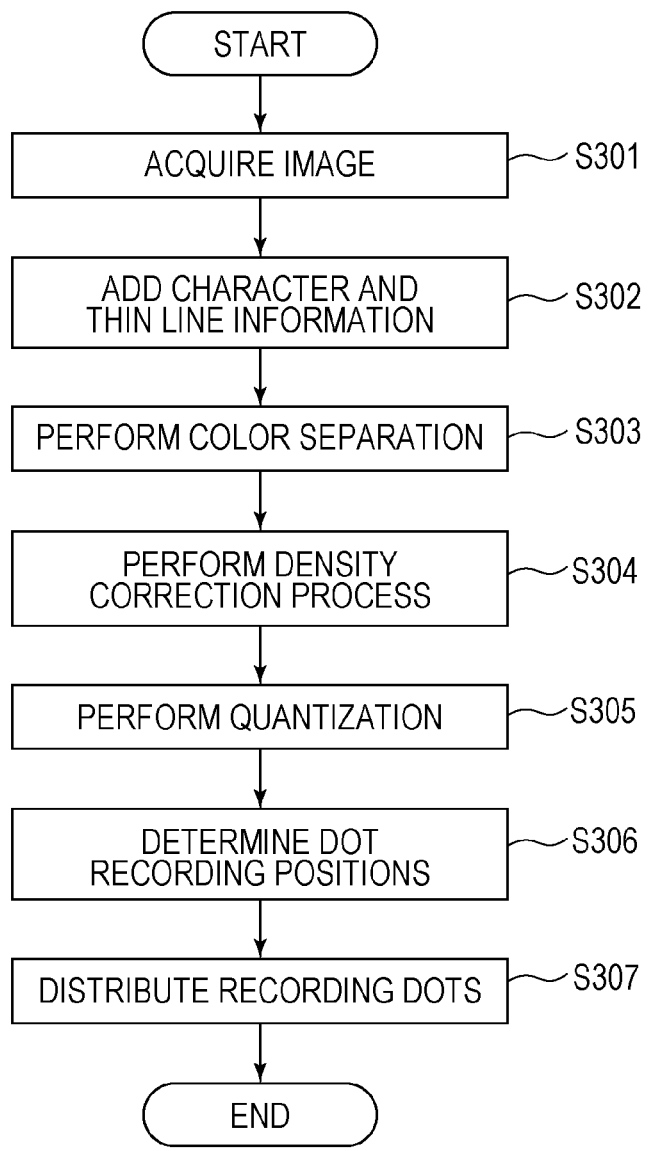
FIG. 15 is a flow chart illustrating image processing according to a third embodiment.

FIG. 15 a flow chart illustrating image processing according to the present embodiment. This image processing is similar to that according to the first embodiment (steps S11 and S12 and steps S13 to S16 in FIG. 3) except for a process of adding character and thin line information in step S302 and a density correction process in step S304. In step S302, the attribute information of the pixel of interest is acquired, and a determination is performed based on the acquired attribute information as to whether the pixel is an element of a character or a thin line, and the information indicating the determination result is added. In the present embodiment, a line with a width of 1 mm or less is defined as a thin line, although the definition of the thin line is not limited to this.

FIG. 16 is a flow chart illustrating details of the density correction process in step S304 in FIG. 15. Step S311 and steps S313 to S315 are similar to corresponding steps (steps S1 to S5 in FIG. 8) according to the first embodiment. In step S312, based on the information added in step S302, a determination is performed as to whether the pixel of interest is an element of a character or a thin line. In a case where the pixel of interest is not an element of a character or a thin line, the processing flow proceeds to step S313, in which a correction process is performed to reduce the ink data value. On the other hand, in a case where the pixel of interest is an element of a character or a thin line, the processing flow proceeds to step S314 without performing the correction process on the ink data in step S313, and the estimated condensation level is updated.

In the present embodiment, information is added to each of all pixels forming a character or a thin line. However, alternatively, information may be added to a pixel to indicate whether a character or a thin line satisfies a particular condition. For example, information may be added depending on whether a character or a thin line has a particular color or a particular density, or depending on whether a character or a thin line has a particular size.

In the present embodiment, as described above, information is added to a pixel to indicate whether the pixel is an element of a character or a thin line, and the determination as to whether to perform the density correction process is made according to the added information. Thus, the present embodiment allows it to perform the density correction process more properly for pixels that are not elements of a character or a thin line such that unevenness in density of pixels other than those of the character or the thin line are more precisely suppressed than is possible by the density correction process based on the intensity level.

Other Embodiments

In the embodiments described above, the density correction process is not performed for pixels whose ink data value is equal to or larger than the predetermined threshold value or for pixels whose attribute information indicates that the pixels are elements of a character or a thin line. Alternatively, the determination as to whether to perform the density correction process is performed base on both conditions described above. For example, the density correction process may not be performed in a case where a pixel of interest has a value equal to or larger than a predetermined threshold value or in a case where the attribute associated with the pixel indicates that the pixel is an element of a character or a thin line, while the density correction process may be performed in a case where the pixel value is smaller than the predetermined threshold value and the attribute indicates that the pixel is not an element of a character or a thin line.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-136153, filed Jun. 28, 2013 which is hereby incorporated by reference herein in its entirety.

What is claimed is:

1. An image processing method for recording an image on a recording medium by performing relative scanning between the recording medium and a recording head including a nozzle configured to discharge ink, comprising:
determining multilevel recording data such that when a multilevel data value corresponding to a first pixel on the recording medium is equal to or larger than a predetermined threshold value, the multilevel data value is employed as a value of the multilevel recording data, while when the multilevel data value is smaller than the predetermined threshold value, the multilevel data value is corrected based on a first parameter representing a degree of condensation of ink when the first pixel is recorded by a nozzle assigned to record the first pixel, and the corrected multilevel data value is employed as the value of the multilevel recording data; and
generating a second parameter based on the determined value of the multilevel recording data and the first parameter, the second parameter representing a degree of condensation of ink in the nozzle used in recording the first pixel when a second pixel is recorded by the nozzle next after the first pixel.

2. The image processing method according to claim 1, wherein the multilevel data value is corrected such that when the multilevel data value is smaller than the predetermined threshold value, the multilevel data value is corrected using a correction table representing correspondence among the multilevel data value, the first parameter, and a correction amount by which to correct the multilevel data value.

3. The image processing method according to claim 1, wherein the second pixel is a pixel located adjacent to the first pixel.

4. The image processing method according to claim 1, wherein the recording head includes a plurality of nozzles, and wherein the first pixel and the second pixel are recorded using two or more of the nozzles.

5. The image processing method according to claim 1, wherein the image is recorded on the recording medium using the recording head based on the determined multilevel recording data value.

6. The image processing method according to claim 1, wherein the ink includes black ink.

7. An image processing method for recording an image on a recording medium by performing relative scanning between the recording medium and a recording head including a nozzle configured to discharge ink, comprising:
generating multilevel recording data using a correction table representing correspondence among a multilevel data value corresponding to a first pixel on the recording medium, a first parameter representing a degree of condensation of ink when the first pixel is recorded by a nozzle assigned to record the first pixel, and a correction amount for correcting the multilevel data value; and
generating a second parameter based on the generated multilevel recording data and the first parameter, the second parameter representing a degree of condensation of ink in the nozzle used in recording the first pixel at a time when a second pixel is recorded by the nozzle next after the first pixel,
wherein the correction table is set such that the correction amount is larger than 0 in a case where the multilevel data has a value equal to or greater than a predetermined threshold value while the correction amount is 0 in a case where the multilevel data has a value smaller than the predetermined threshold value.

8. An image processing method for recording an image on a recording medium by performing relative scanning between the recording medium and a recording head including a nozzle configured to discharge ink, comprising:
determining multilevel recording data such that when a first pixel on the recording medium is an element of a character or a thin line, a value of multilevel data corresponding to the first pixel is employed as a value of multilevel recording data, while when the first pixel on the recording medium is not an element of a character or a thin line, the value of the multilevel data is corrected based on a first parameter representing a degree of condensation of ink at a time when the first pixel is recorded by a nozzle assigned to record the first pixel, and the corrected value is employed as the value of the multilevel recording data; and
generating a second parameter based on the determined value of the multilevel recording data and the first parameter, the second parameter representing a degree of condensation of ink in the nozzle used in recording the first pixel when a second pixel is recorded by the nozzle next after the first pixel.

9. An image processing apparatus configured to record an image on a recording medium by performing relative scanning between the recording medium and a recording head including a nozzle configured to discharge ink, comprising:
a determination unit configured to determine multilevel recording data such that when a multilevel data value corresponding to a first pixel on the recording medium is equal to or larger than a predetermined threshold value, the multilevel data value is employed as a value of the multilevel recording data, while when the multilevel data value is smaller than the predetermined threshold value, the multilevel data value is corrected based on a first parameter representing a degree of condensation of ink at a time when the first pixel is recorded by a nozzle assigned to record the first pixel, and the corrected multilevel data value is employed as the value of the multilevel recording data; and
a generation unit configured to generate a second parameter based on the determined multilevel recording data and the first parameter, the second parameter representing a degree of condensation of ink in the nozzle used in recording the first pixel at a time when a second pixel is recorded by the nozzle next after the first pixel.

* * * * *